United States Patent
Penno

(10) Patent No.: US 9,415,249 B2
(45) Date of Patent: Aug. 16, 2016

(54) DEVICE FOR PROTECTING A CONTAINER OR A CONDUIT FROM AN EXPLOSION

(75) Inventor: Bernhard Penno, Brilon (DE)

(73) Assignee: REMBE GMBH SAFETY+CONTROL, Brilon (DE)

( * ) Notice: Subject to any disclaimer, the term of this patent is extended or adjusted under 35 U.S.C. 154(b) by 0 days.

(21) Appl. No.: 13/216,797

(22) Filed: Aug. 24, 2011

(65) Prior Publication Data

US 2012/0048575 A1 Mar. 1, 2012

(30) Foreign Application Priority Data

Aug. 25, 2010 (DE) .......................... 10 2010 035 517

(51) Int. Cl.
| | |
|---|---|
| *A62C 4/02* | (2006.01) |
| *A62C 4/00* | (2006.01) |
| *B65D 90/32* | (2006.01) |
| *F16L 55/055* | (2006.01) |
| *A62C 4/04* | (2006.01) |

(52) U.S. Cl.
CPC ... *A62C 4/00* (2013.01); *A62C 4/02* (2013.01); *B65D 90/325* (2013.01); *F16L 55/055* (2013.01); *A62C 4/04* (2013.01)

(58) Field of Classification Search
CPC .............. A62C 4/00; A62C 4/02; A62C 4/04; B65D 90/325
USPC ........... 169/45, 48, 49, 54, 56, 11, 14, 15, 70, 169/68, 66, 5, 7–9; 220/88.1, 88.2; 431/346
See application file for complete search history.

(56) References Cited

U.S. PATENT DOCUMENTS

| | | | | |
|---|---|---|---|---|
| 1,298,872 A | * | 4/1919 | Bowles | 220/88.2 |
| 1,672,042 A | * | 6/1928 | Schmidt et al. | 220/88.2 |
| 1,907,976 A | * | 5/1933 | Jones | 48/192 |
| 2,157,298 A | * | 5/1939 | Mulier | 220/89.4 |
| 2,247,566 A | * | 7/1941 | Walton | 137/254 |
| 2,352,256 A | * | 6/1944 | De Motte | 48/192 |
| 2,801,517 A | * | 8/1957 | Zucrow et al. | 137/68.13 |
| 3,463,227 A | * | 8/1969 | Smith | 166/75.13 |
| 3,472,419 A | * | 10/1969 | King | 220/88.2 |
| 3,830,307 A | * | 8/1974 | Bragg et al. | 169/9 |
| 3,871,458 A | * | 3/1975 | Dumazet | 169/45 |
| 4,339,412 A | * | 7/1982 | Durand et al. | 422/117 |
| 4,378,920 A | * | 4/1983 | Runnels et al. | 244/135 R |
| 4,460,128 A | * | 7/1984 | Lazarre | 239/533.1 |
| 4,487,266 A | * | 12/1984 | Gillis et al. | 169/51 |
| 4,519,458 A | * | 5/1985 | Kroeter | 169/56 |

(Continued)

FOREIGN PATENT DOCUMENTS

EP 1974774 A1 3/2008

OTHER PUBLICATIONS

German Search Report for Application No. 10 2010 035 517.8.

*Primary Examiner* — Arthur O Hall
*Assistant Examiner* — Alexander Valvis
(74) *Attorney, Agent, or Firm* — Cohen & Hildebrand, PLLC

(57) ABSTRACT

A device inhibiting propagation of explosions using a pipe having an inlet and an outlet. The inlet is connectable to a container to be protected or to a conduit to be protected. The device further includes a mechanism for building up a pressure difference so that a higher pressure is generated in a first region of the pipe located upstream of the outlet in the direction of the inlet and a lower pressure is generated in a second region located upstream of the first region in the direction of the inlet.

18 Claims, 3 Drawing Sheets

(56) References Cited

U.S. PATENT DOCUMENTS

Figure 1:
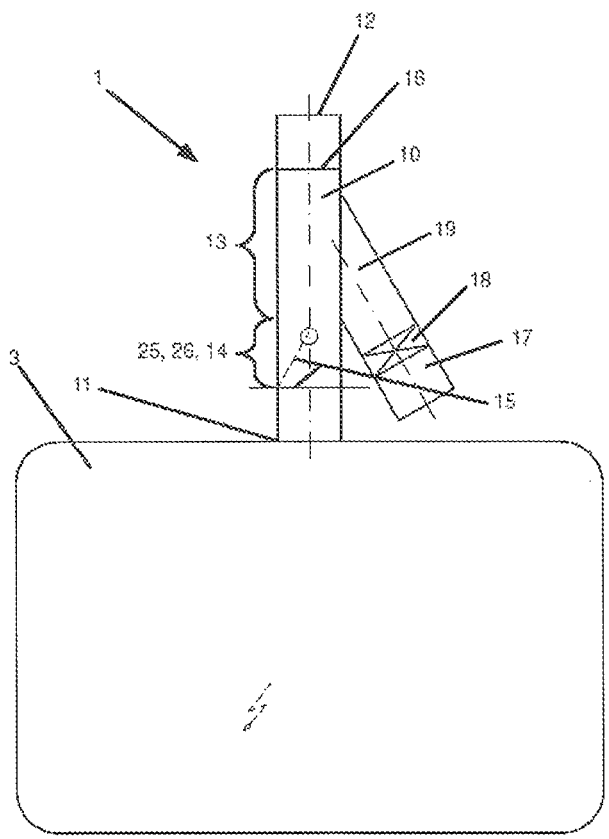

| | | | | |
|---|---|---|---|---|
| 4,834,187 A * | 5/1989 | Bragg | | 169/62 |
| 5,018,585 A * | 5/1991 | Brennecke et al. | | 169/48 |
| 5,152,346 A * | 10/1992 | Wilson | | 169/52 |
| 5,154,237 A * | 10/1992 | Cooper | | 169/54 |
| 5,224,550 A * | 7/1993 | Bragg | | 169/62 |
| 5,377,765 A * | 1/1995 | Kaylor | | A62C 3/06 169/15 |
| 5,676,712 A * | 10/1997 | Anderson | | A62C 4/02 122/395 |
| 5,707,356 A * | 1/1998 | Paul | | 604/119 |
| 5,826,664 A * | 10/1998 | Richardson | | 169/46 |
| 5,904,190 A * | 5/1999 | Patel | | 141/198 |
| 6,908,377 B2 * | 6/2005 | Knyrim et al. | | 454/194 |
| 7,210,536 B2 * | 5/2007 | Alhamad | | 169/45 |
| 7,740,081 B2 * | 6/2010 | Edwards et al. | | 169/60 |
| 2006/0260825 A1 * | 11/2006 | Cannell | | 169/48 |

\* cited by examiner

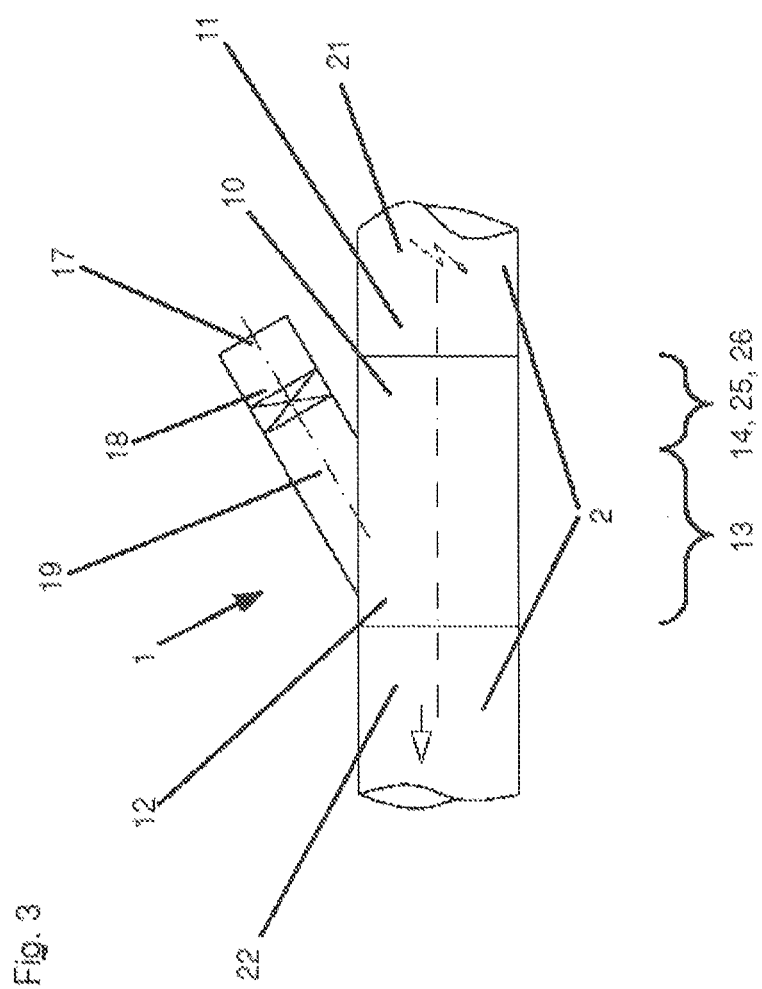

DEVICE FOR PROTECTING A CONTAINER OR A CONDUIT FROM AN EXPLOSION

BACKGROUND OF THE INVENTION (1) Field of the Invention

The present invention relates to a device for inhibiting propagation of explosions with a pipe having an inlet and an outlet, wherein the inlet can be connected to a container to be protected or to a conduit to be protected.

(2) Description of Related Art

A device for preventing the propagation of explosions is known, for example, from the document EP 1 974 774 A1. The concept underlying the device disclosed in this document uses an advancing shock wave to open a container containing an extinguishing agent and to introduce the extinguishing agent into the pipe before the shockwave from the explosion arrives.

It is the object of the present invention to propose an alternative solution to the solution disclosed in the document EP 1 974 774 A1.

BRIEF SUMMARY OF THE INVENTION

The object according to the invention is initially attained in that the device has means for building up a pressure difference capable of generating a high pressure in a first region of the pipe located in the direction of the inlet upstream of the outlet and a low pressure in a second region located in the direction of the inlet upstream of the first region. When an explosion is detected in the container to be protected or in the conduit to be protected, the pressure difference is built up in the pipe. An incoming shock wave into the pipe via the inlet then first enters the second region having the low pressure, where pressure equalization takes place, absorbing a portion of the energy of the incoming shockwave.

At the same time, a high pressure compared to the second region is built up in the first region. This high pressure prevents the incoming shockwave from entering more deeply, as soon as the pressure equalization has taken place in the second region.

The object is also attained in that the device has means for reducing the concentration of oxygen particles in a third region arranged between the inlet and the outlet of the pipe. By reducing the concentration of oxygen particles in the third region, wherein oxygen is preferably completely removed from the third region, the third region then lacks an environment which enables or promotes combustion, in the most favorable situation, a flame front arriving in the third region is then suffocated due to lack of oxygen required for the combustion.

Preferably, the two solutions according to the invention are combined in a single device. Preferably, the second region and the third region then coincide at least partially with each other. To the extent they coincide, they form a fourth region. After an explosion is detected in the container to be protected or in the conduit to be protected, an oxygen-depleted or oxygen-free volume with a low pressure compared to the first region is produced in the fourth region.

The means for building up the pressure difference and/or the means for changing the concentration of oxygen particles may include a pressure vessel. The pressure vessel may be connected with the first region of the pipe via a connection. A content of the pressure vessel may be transported into the first region via this connection.

The inlet of the connection into the first region of the pipe may be constructed to promote a flow from the connection into the first region towards a center or a center axis of the pipe. Alternatively, the inlet may be constructed so as to completely or partially guide a flow from the connection past the center or the center axis. Alternatively, the inlet and/or the first region may be constructed so as to impress an angular momentum on a flow entering from the connection into the first region. This angular momentum may be suited to stabilize the desired pressure distribution between the first region and second region.

The center axes of the pipe and the connection may be skewed with respect to one another or may intersect each other.

The pressure vessel may be filled with an inert fluid, in particular an inert gas, for example a noble gas. Alternatively, the pressure vessel may be filled with air. Moreover, a mixture of a gas and a fluid, for example water, may be arranged in the vessel, wherein the fluid is expelled as fog. The fluid, in particular an inert gas, may also be used to expel a powdery solid disposed in the pressure vessel. The solid may be a solid having inerting properties.

The first region of the pipe may form a mixing chamber, and the connection between the pressure vessel and the first region of the pipe may form a propellant nozzle of a jet pump. The jet pump, which is driven by the fluid exiting the pressure vessel, causes the air residing in the second, third and optionally fourth region to be suctioned off, causing the concentration of oxygen particles and the pressure in the second, third and/or fourth region to decrease. At the same time, the pressure the first region is increased.

The connection between the pressure vessel and the pipe may include a constriction or a nozzle. Alternatively, the pipe may include a constriction or a nozzle, for example at a transition from the second to the third region. A flow-conducting element, for example a baffle or a nozzle, may also be provided at the transition from the second to the third region. The flow-conducting element may be suitable and constructed to impose an angular momentum on the medium flowing therethrough, which advantageously stabilizes the pressure conditions and/or the flow conditions in the device according to the invention.

The connection may also include a valve, preferably a controllable valve. The controllable valve may be opened instantaneously in response to detection of an explosion in the container to be protected or the conduit to be protected. The fluid exiting the pressure vessel causes an increase in the pressure difference and/or a decrease in the oxygen concentration in the second, third and/or fourth region. If a jet pump is formed in the device according to the invention, then the fluid is a propellant driving the jet pump.

The inlet of the pipe may be closed with a cover or a burst disk. The cover is opened in the event of an explosion in the container to be protected or in the conduit to be protected. A burst disk is destroyed in an explosion.

The cover may entirely or partially consist of a shape memory alloy, When heat is generated, the shape memory alloy of the cover may cause the shape of the cover or of a portion of the cover to change. The inlet can thereby be unblocked in the event of an explosion where heat is generated.

A drive for opening the cover may be associated with the cover. The drive may be a spring, for example a leg spring, or a motorized drive. The drive may also include an element formed from a shape memory alloy.

A device according to the invention may have locking means constructed to secure the cover in a closed position.

The locking means may be made entirely or partially from a shape memory alloy. The device may have a flame arrester located at the outlet.

The pipe of a device according to the invention may be inserted in the conduit to be protected. The inlet of the pipe can then be connected with an inlet section of the conduit. The outlet may then be connected with an outlet section of the conduit. In such arrangements of a device according to the invention, a pressure gradient exists from the inlet section to the outlet section of the pipe.

BRIEF DESCRIPTION OF THE SEVERAL VIEWS OF THE DRAWING(S)

Figure 2:
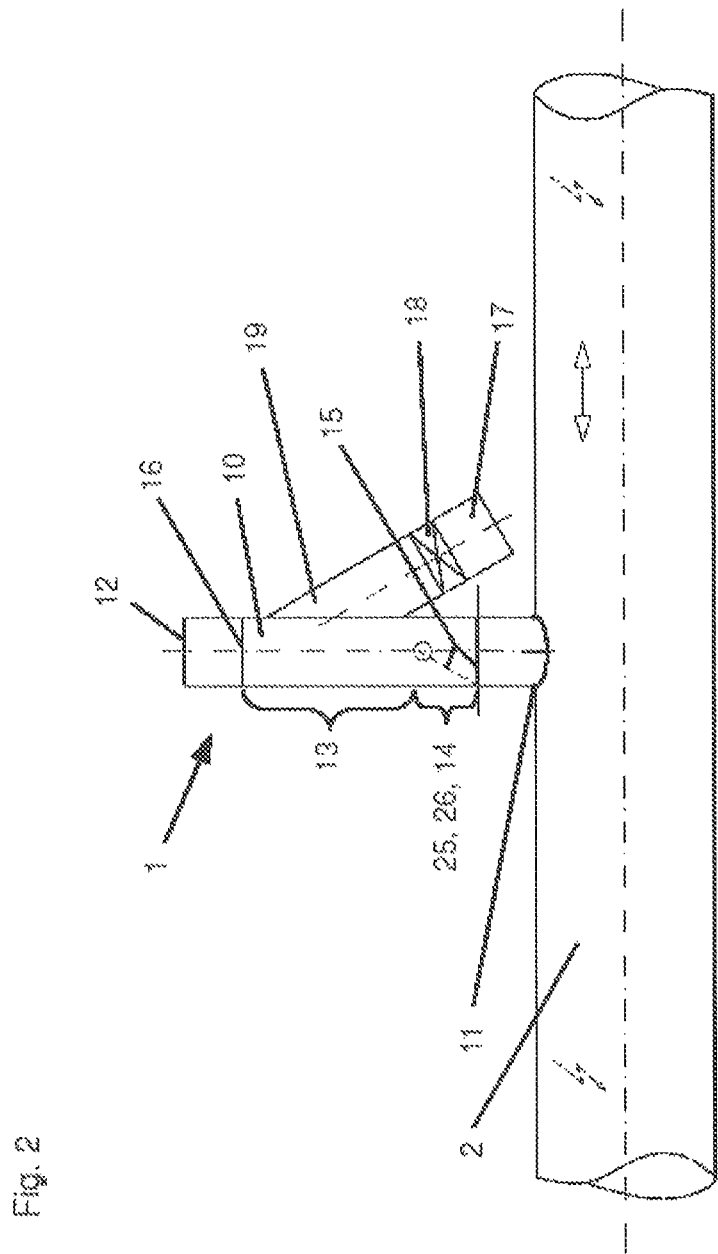

Exemplary embodiments of the invention are schematically illustrated in the drawings, which show in:

FIG. 1 a device according to the invention for securing a container,

FIG. 2 the same device for securing a conduit, and

FIG. 3 another device according to the invention arranged in a conduit.

DETAILED DESCRIPTION OF THE INVENTION

The device 1 according to the invention illustrated in the Figures may be used, for example, to protect a container 3 (FIG. 1) or to protect a conduit 2 (FIG. 2). It would also be feasible, for example, to protect with the device according to the invention an elevator or another conveying system.

The device 1 according to the invention includes a pipe 10 which is connected via an inlet 11 with the container 3 to be protected or the conduit 2 to be protected. An outlet 12 of the device 1 is connected with the environment. A fluid can flow through the device 1 or the pipe 10 from the inlet to the outlet as soon as an explosion has developed inside the container 3 or the conduit 2.

In a failure-free situation, a flow through the device is prevented by a cover 15. This cover 15 is unblocked in the event of an explosion and opens, so that an explosive shockwave can enter the device 1. In a failure-free situation, the cover 15 may be held in the closed state by an unillustrated locking means.

A flame arrester 16 is arranged upstream of the outlet 12 of the pipe 10. The space inside the pipe 10 between the cover 15 and the flame arrester 16 is divided into two functionally different regions 13, 14. The first region 13 is located upstream of the flame arrester 16 and the second region 14 is located between the first region 13 and the cover 15. A connection 19 in form of an additional pipe merges into the first region at an angle of about 20° to 50°. This connection 19 connects the first region 13 with a pressure vessel 17 by way of a valve 18, The valve 18 is controlled in an unillustrated manner and opens abruptly when an explosion is detected in the container 3 or in the conduit 2.

When the valve 18 opens and the inert gas stored in the pressure vessel enters the first region 13 via the connection 19, the pressure in the first region 13 increases. At the same time, air is suctioned in from the second region 14 consistent with the principle of a jet pump, thus producing a vacuum in the second region. The concentration of oxygen particles is then also reduced in the second region. This produces a combustion-inhibiting atmosphere in the second region 14.

The device according to the invention illustrated in FIG. 3 is similar to the devices illustrated in FIGS. 1 and 2, with the difference from the aforedescribed devices that the region of the inlet lacks a cover. The same reference symbols as in FIGS. 1 and 2 are used to designate identical or similar structural features in FIG. 3.

However, there is more than structural difference between the devices illustrated in FIGS. 1 and 2 and the device illustrated in FIG. 3. Whereas in the device illustrated in FIGS. 1 and 2 the container 3 and conduit 2 on the other side of the inlet 11 or the cover 15 are in a failure-free normal operation separated by the cover 15 from the first section, the second section and the outlet 12, i.e. the pipe 10 does not carry a flow, flow through the pipe 10 of the device 1 is possible in the device illustrated in FIG. 3 even in failure-free normal operation. In the embodiment illustrated in FIG. 3, the device 1 is inserted in a conduit 2. The conduit 2 has an inlet section 21 connected to the inlet 11 and an outlet section 22 connected to the outlet 12. The propagation of an explosive shockwave approaching from the inlet section 21 into the outlet section 22 can be suppressed in the device 1 of the invention or at least inhibited.

The invention claimed is:

1. A device inhibiting propagation of explosions comprising:
a pipe having a single outlet connected with the environment, wherein the pipe is directly connected to a container to be protected or to a conduit to be protected via a single inlet, a first region of the pipe is located upstream of the outlet in a direction of the inlet and a second region of the pipe is located upstream of the first region in the direction of the inlet, and
a pressure vessel directly connected to the pipe via a single fluid connection at an interface between an outlet opening of the pressure vessel from which a stored fluid exits therefrom with an opening defined in a wall of the first region of the pipe, wherein the single fluid connection comprises a valve and the pressure vessel is filled with the stored fluid; and
upon an explosion being detected in the container to be protected or in the conduit to be protected the valve opens causing the stored fluid in the pressure vessel to enter via the single fluid connection into the first region increasing the pressure in the first region while at the same time suctioning air from the second region via the single fluid connection that merges into the opening defined in the wall of the first region; at the interface between the outlet opening of the pressure vessel with the opening defined in the wall of the first region of the pipe, the pressure vessel is disposed at an angle of about 20° to about 50° relative to that of the pipe; wherein the pressure vessel is configured to dispense the stored fluid in a direction of the outlet of the pipe connected with the environment.

2. The device according to claim 1, wherein the pressure vessel reduces concentration of oxygen particles in a third region arranged between the inlet and the outlet of the pipe.

3. The device according to claim 2, Wherein the second region and the third region at least partially coincide with each other and form, to the extent they coincide, a fourth region.

4. The device according to claim 1, wherein the stored fluid is an inert fluid.

5. The device according to claim 1, wherein the first region of the pipe forms a mixing chamber.

6. The device according to claim 1, wherein the single fluid connection comprises a nozzle.

7. The device according to claim 1, wherein the inlet is closed with a cover.

8. The device according to claim 7, wherein the cover is at least partially made of a shape memory alloy.

9. The device according to claim 1, further comprising a flame arrestor disposed at the outlet of the pipe.

10. The device according to claim 1, wherein the inlet of the pipe is directly connectable to the conduit to be protected: and the pipe is inserted into the conduit to be protected, in that the inlet of the pipe is connected with an inlet section of the conduit and the outlet of the pipe is connected with an outlet section of the conduit.

11. The device according to claim 1, wherein the stored fluid is an inert gas.

12. The device according to claim 1, wherein the valve is a controllable valve that is open when an explosion is detected.

13. The device according to claim 7, wherein the cover is a burst disk.

14. The device according to claim 1, wherein the outlet opening of the pressure vessel represents a terminating end of the pressure vessel, the outlet opening of the pressure vessel is aligned with the opening in the wall of the first region of the pipe.

15. A device inhibiting propagation of explosions comprising:
a pipe having a single outlet connected with the environment, wherein the pipe is directly connected to a container to be protected or to a conduit to be protected via a single inlet, a first region of the pipe is located upstream of the outlet in a direction of the inlet and a second region of the pipe is located upstream of the first region in the direction of the inlet, and
a pressure vessel directly connected to the pipe via a single fluid connection at an interface between an outlet opening of the pressure vessel from which a stored fluid exits therefrom with an opening defined in a wall of the first region of the pipe, wherein the single fluid connection comprises a valve and the pressure vessel is filled with the stored fluid; and upon an explosion being detected in the container to be protected or in the conduit to be protected the valve opens causing the stored fluid in the pressure vessel to enter via the single fluid connection into the first region increasing the pressure in the first region while at the same time suctioning air from the second region via the single fluid connection that merges into the opening defined in the wall of the first region; at the interface between the outlet opening of the pressure vessel with the opening defined in the wall of the first region of the pipe, the pressure vessel is disposed at an angle of about 20° to about 50° relative to that of the pipe, wherein the pressure vessel is configured to dispense the stored fluid in a direction of the outlet of the pipe connected with the environment,
wherein the inlet is closed with a cover or a rupture disk.

16. The device according to claim 15, wherein the outlet opening of the pressure vessel represents a terminating end of the pressure vessel, the outlet opening of the pressure vessel is aligned with the opening in the wall of the first region of the pipe.

17. A device inhibiting propagation of explosions comprising:
a pipe having a single outlet connected with the environment, wherein the pipe is directly connected to a container to be protected or to a conduit to be protected via a single inlet, a first region of the pipe is located upstream of the outlet in a direction of the inlet and a second region of the pipe is located upstream of the first region in the direction of the inlet, and
a pressure vessel directly connected to the pipe via a single fluid connection at an interface between an outlet opening of the pressure vessel from which a stored fluid exits therefrom with an opening defined in a wall of the first region of the pipe, wherein the single fluid connection comprises a valve and the pressure vessel is filled with the stored fluid; and upon an explosion being detected in the container to be protected or in the conduit to be protected the valve opens causing the stored fluid in the pressure vessel to enter via the single fluid connection into the first region increasing the pressure in the first region while at the same time suctioning air from the second region via the single fluid connection that merges into the opening defined in the wall of the first region; at the interface between the outlet opening of the pressure vessel with the opening defined in the wall of the first region of the pipe, the pressure vessel is disposed at an angle of about 20° to about 50° relative to that of the pipe, wherein the pressure vessel is configured to dispense the stored fluid in a direction of the outlet of the pipe connected with the environment,
wherein the pressure vessel reduces concentration of oxygen particles in a third region arranged between the inlet and the outlet of the pipe;
wherein the first region of the pipe forms a mixing chamber and the connection propels the inert fluid from the pressure vessel into the first region of the pipe.

18. The device according to claim 17, wherein the outlet opening of the pressure vessel represents a terminating end of the pressure vessel, the outlet opening of the pressure vessel is aligned with the opening in the wall of the first region of the pipe.

* * * * *